United States Patent
Lee et al.

(10) Patent No.: US 10,336,005 B2
(45) Date of Patent: Jul. 2, 2019

(54) MANUFACTURING APPARATUS OF DISPLAY DEVICE

(71) Applicant: Samsung Display Co., Ltd., Yongin-si, Gyeonggi-do (KR)

(72) Inventors: Jusuk Lee, Busan (KR); Jaeyoung Kim, Asan-si (KR); Yudeok Seo, Hwaseong-si (KR); Dongjin Ok, Hwaseong-si (KR); Sungjin Jang, Daejeon (KR)

(73) Assignee: Samsung Display Co., Ltd., Yongin-si (KR)

( * ) Notice: Subject to any disclaimer, the term of this patent is extended or adjusted under 35 U.S.C. 154(b) by 394 days.

(21) Appl. No.: 15/344,064

(22) Filed: Nov. 4, 2016

(65) Prior Publication Data

US 2017/0129165 A1 May 11, 2017

(30) Foreign Application Priority Data

Nov. 5, 2015 (KR) .................. 10-2015-0155333

(51) Int. Cl.
*B23P 19/00* (2006.01)
*B29C 65/00* (2006.01)
(Continued)

(52) U.S. Cl.
CPC ...... *B29C 66/81422* (2013.01); *B29C 66/733* (2013.01); *B29C 66/7314* (2013.01); *B29C 66/7315* (2013.01); *B29C 66/74* (2013.01); *B29C 66/81423* (2013.01); *B32B 1/00* (2013.01); *B32B 17/00* (2013.01); *B32B 18/00* (2013.01); *B32B 25/00* (2013.01);
(Continued)

(58) Field of Classification Search
CPC .............. B29C 66/81422; B29C 66/74; B29C 66/7314; B29C 66/7315; B29C 66/733; B29C 66/81423; B29C 65/00; B32B 1/00; B32B 25/00; B32B 18/00; B32B 37/0046
See application file for complete search history.

(56) References Cited

U.S. PATENT DOCUMENTS 9,498,938 B2 * 11/2016 Son ................... B32B 37/0046
9,796,169 B2 * 10/2017 Kim ................... B32B 37/1292
(Continued)

FOREIGN PATENT DOCUMENTS

JP          2005-273014 A     10/2005
KR     10-2012-0088025 A       8/2012
(Continued)

*Primary Examiner* — Paul D Kim
(74) *Attorney, Agent, or Firm* — Lewis Roca Rothgerber Christie LLP

(57) ABSTRACT

A manufacturing apparatus of a display device includes a first jig configured to hold a first member; a second jig located under the first jig and coupled to or separated from the first jig such that the first member is locatable between the first jig and the second jig; fixing parts located at both ends of the second jig and configured to hold a second member between the first member and the second jig, the second jig including a pad; and a stage located under the pad and provided with a groove formed therethrough and having an area smaller than an area of the pad when viewed in a plan view, wherein one portion of the pad, which faces the stage, is configured to be within the groove.

16 Claims, 8 Drawing Sheets

(51) Int. Cl.
- *B32B 1/00* (2006.01)
- *B32B 17/00* (2006.01)
- *B32B 25/00* (2006.01)
- *B32B 18/00* (2006.01)
- *B32B 37/00* (2006.01)
- B29L 31/34 (2006.01)
- B29L 9/00 (2006.01)

(52) U.S. Cl.
CPC ....... *B32B 37/0046* (2013.01); *B29L 2009/00* (2013.01); *B29L 2031/3475* (2013.01); *B32B 2250/03* (2013.01); *B32B 2307/20* (2013.01); *B32B 2307/40* (2013.01); *B32B 2307/546* (2013.01); *B32B 2315/02* (2013.01); *B32B 2315/08* (2013.01); *B32B 2398/00* (2013.01); *B32B 2457/08* (2013.01)

(56) References Cited

U.S. PATENT DOCUMENTS

| | | | |
|---|---|---|---|
| 9,889,602 B2* | 2/2018 | Kim | B32B 37/10 |
| 10,105,943 B2* | 10/2018 | Kim | B32B 38/1841 |
| 10,194,538 B2* | 1/2019 | Lee | H05K 5/0017 |
| 2014/0002975 A1* | 1/2014 | Lee | H05K 5/0017 |
| | | | 361/679.01 |
| 2017/0050424 A1* | 2/2017 | Son | B32B 37/10 |

FOREIGN PATENT DOCUMENTS

| | | |
|---|---|---|
| KR | 10-2014-0101247 A | 8/2014 |
| KR | 10-2014-0120568 A | 10/2014 |
| KR | 10-2015-0012593 A | 2/2015 |
| KR | 10-2015-0013716 A | 2/2015 |

* cited by examiner

MANUFACTURING APPARATUS OF DISPLAY DEVICE

CROSS-REFERENCE TO RELATED APPLICATION

This U.S. non-provisional patent application claims priority to and the benefit of Korean Patent Application No. 10-2015-0155333, filed on Nov. 5, 2015, the entire content of which is hereby incorporated by reference.

BACKGROUND

1. Field of Disclosure

The present disclosure relates to a manufacturing apparatus of a display device.

2. Description of the Related Art

Recently, portable electronic devices have been widely used. Of these portable electronic devices, tablet PCs as well as small-sized electronic devices, e.g., mobile phones, have recently become popular.

Such portable electronic devices include a display device for providing visual information, e.g., an image, supporting their various functions. As components for driving the display device become smaller, the proportion of the display device in the portable electronic devices gradually increases. In recent years, since the portable electronic devices are provided in various designs, there is a growing need for a flexible display device and a manufacturing apparatus of the flexible display device.

SUMMARY

The present disclosure provides a manufacturing apparatus of a display device, which has an improved stability.

Embodiments of the inventive concept provide a manufacturing apparatus of a display device including a first jig configured to hold a first member, a second jig located under the first jig and coupled to or separated from the first jig such that the first member is located between the first jig and the second jig, and fixing parts located at both ends of the second jig and configured to hold a second member to allow the second member to be placed between the first member and the second jig.

The second jig includes a pad and a stage. The stage is located under the pad and provided with a groove formed therethrough, and the groove has an area smaller than an area of the pad when viewed in a plan view.

A portion of the pad, which faces the stage, is configured to be within the groove.

The groove includes a bottom portion which is flat and sidewalls bent and extending from the bottom portion, and the sidewalls include a first sidewall having a curved shape. The first sidewall has an inclination angle that gradually reduces as a distance from the bottom portion increases.

The pad includes an upper surface facing the first jig and having a curved shape with respect to a first direction, a lower surface facing the upper surface, and connection surfaces connecting the upper surface and the lower surface.

The lower surface includes a plane portion facing the bottom portion and concave portions extending from the plane portion to connect the plane portion and the connection surfaces and each facing a corresponding sidewall of the sidewalls. The concave portions include a first concave portion having a curved shape to correspond to a shape of the first sidewall.

The upper surface is curved to protrude towards the first jig with respect to a plane surface defined by the first direction and a second direction crossing the first direction.

The pad includes at least one of silicone, urethane, and rubber.

The second jig further includes a dam facing at least one connection surface of the connection surfaces of the pad.

The dam has a height in a third direction, which is substantially perpendicular to the first direction and the second direction, the height of the dam is between about 10% to about 30% of a maximum height of the pad in the third direction.

The dam includes a metal or plastic material.

The first jig includes a flat area and bending areas extending from the flat area and spaced from each other such that the flat area is located between the bending areas.

The first member is a window and the second member is an electric panel having a flexibility.

According to the above, the manufacturing apparatus of the display device includes the stage and the dam to improve the stability of the pad, and thus the display device having improved quality may be manufactured.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Like numbers refer to like elements throughout. The use of the terms first, second, etc. do not denote any order or importance, but rather the terms first, second, etc. are used to distinguish one element from another. Like numerals refer to like elements throughout. It will be understood that when an element such as a layer, film, region, or substrate is referred to as being "on" another element, it can be directly on the other element or intervening elements may also be present. It is to be understood that the singular forms "a," "an," and "the" include plural referents unless the context clearly dictates otherwise.

Hereinafter, the present disclosure will be explained in detail with reference to the accompanying drawings.

Figure 1:
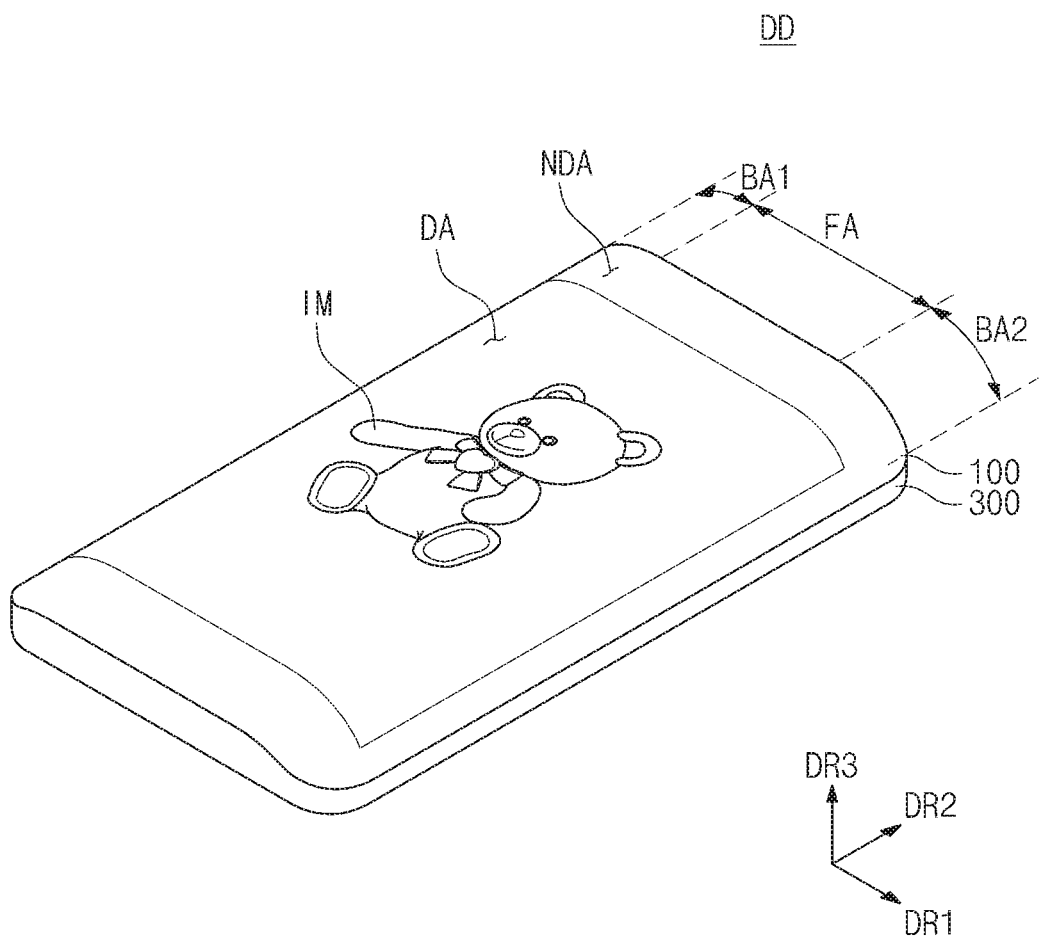
FIG. 1 is a perspective view showing a display device according to an exemplary embodiment of the present disclosure.
Figure 2:
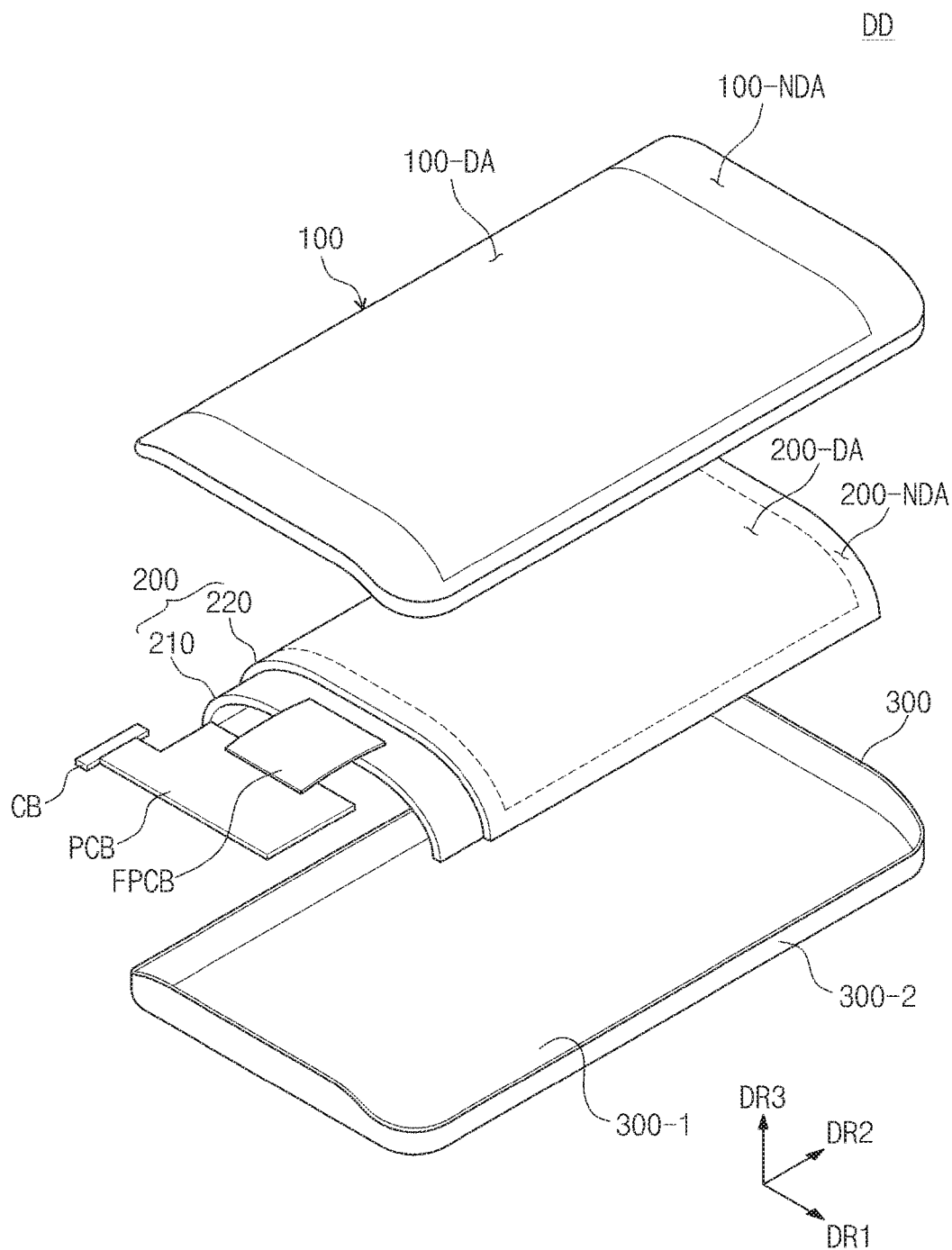
FIG. 2 is an exploded perspective view showing a display device according to an exemplary embodiment of the present disclosure.

FIG. 1 is a perspective view showing a display device DD according to an exemplary embodiment of the present disclosure, and FIG. 2 is an exploded perspective view showing the display device DD according to an exemplary embodiment of the present disclosure.

In FIG. 1, a portable terminal is shown as the display device DD according to an exemplary embodiment of the present disclosure. The portable terminal may be a tablet PC, a smart phone, a personal digital assistant, a portable multimedia player, a game unit, a wrist-type electronic device, or the like, but is not limited thereto. For instance, the display device DD may be applied to a large-sized electronic item, such as a television set, an outdoor billboard, etc., and a small and medium-sized electronic item, such as a personal computer, a notebook computer, a navigation unit, a camera, etc. In addition, the display device DD may be applied to other electronic devices as long as the display device DD employs the inventive concept of the present disclosure.

As shown in FIG. 1, the display device DD is divided into a plurality of areas distinct from each other on a display surface thereof. The display device DD includes a display part DA displaying an image IM thereon and a non-display part NDA located adjacent to the display part DA. As an example, the display part DA may have a substantially quadrangular shape when viewed in a plan view and the non-display part NDA may be located to surround the display part DA.

According to the present exemplary embodiment of the present disclosure, the display device DD has a bent shape at a portion thereof. The display device DD includes a flat area FA and bent areas BA1 and BA2 connected to the flat area FA.

The flat area FA is substantially parallel to a plane surface defined by a first direction DR1 and a second direction DR2 crossing the first direction DR1. Hereinafter, a direction to which the image IM is provided will be referred to as a third direction DR3 and the third direction DR3 is substantially perpendicular to the first direction DR1 and the second direction DR2. The third direction DR3 may be a reference direction to distinguish a front surface and a rear surface of each component in the display device DD. However, directions indicated by the first, second, and third directions DR1, DR2, and DR3 are relative.

The bent areas BA1 and BA2 include a first bent area BA1 and a second bent area BA2. The first bent area BA1 and the second bent area BA2 are spaced from each other in the first direction DR1 and the flat area FA is located between the first and second bent areas BA1 and BA2. The first bent area BA1 has a shape gradually bending from an opposite direction of the first direction DR1 to an opposite direction of the third direction DR3. The second bent area BA2 has a shape gradually bent from the first direction DR1 to the opposite direction of the third direction DR3.

In FIG. 1, the bent areas BA1 and BA2 include two areas, but are not limited thereto. For instance, the display device DD may include only one of the first bent area BA1 and the second bent area BA2, or the display device DD may include two or more bent areas, if necessary.

Referring to FIGS. 1 and 2, the display device DD includes a window 100, an electric panel 200, and a rear case 300.

The window 100 has a bent shape at at least a portion thereof to correspond to the shape of the bent areas BA1 and BA2 and the flat area FA of the display device DD.

The window 100 includes a transmission area 100-DA transmitting the image IM provided from the electric panel 200 and a non-transmission area 100-NDA located adjacent to the transmission area 100-DA.

The window 100 is located on the electric panel 200. The window 100 includes a base substrate formed of a glass, sapphire, or plastic material, and a base film located on one surface of the base substrate.

The electric panel 200 has a bent shape at at least a portion thereof to correspond to the shape of the bent areas BA1 and BA2 and the flat area FA of the display device DD.

The electric panel 200 is located under the window 100 and provides the image IM through the transmission area 100-DA of the window 100.

The electric panel 200 includes a display area 200-DA and a non-display area 200-NDA. The display area 200-DA displays the image IM and corresponds to the transmission area 100-DA of the window 100. The non-display area 200-NDA is located adjacent to the display area 200-DA and corresponds to the non-transmission area 100-NDA of the window 100.

The electric panel 200 may include a display panel displaying the image IM and a touch panel sensing a touch event occurring thereon. The display panel is located under the touch panel. The display panel included in the electric panel 200 may be an organic light emitting diode display panel, a plasma display panel, a liquid crystal display panel, an electrowetting display panel, an electrophoretic display panel, or a microelectromechanical system display panel.

The touch panel is located between the window 100 and the display panel, but is not limited thereto. In other words, the touch panel may be located inside the display panel. The touch panel is operated by a resistive manner, an electrostatic capacitive manner, or an electromagnetic induction manner and obtains coordinate information of the position at which the touch event occurs.

Hereinafter, the organic light emitting diode display panel, which does not include the touch panel, will be described as the electric panel 200.

The electric panel 200 includes a substrate 210, an organic light emitting diode, and a sealing layer 220. The organic light emitting diode is located on the substrate 210. The sealing layer 220 is located on the substrate 210 and the organic light emitting diode to seal the organic light emitting diode from the outside.

The organic light emitting diode includes a first electrode, an organic light emitting layer, and a second electrode. The first electrode is an anode electrode or a positive electrode. The second electrode is a cathode electrode or a negative electrode. The first electrode generates holes and the second electrode generates electrons. The holes and the electrons generated respectively from the first electrode and the second electrode are injected into the organic light emitting layer. The holes are recombined with the electrons in the organic light emitting layer to generate an exciton, and the exciton emits energy discharged when the excited state returns to a ground state as light.

The electric panel 200 includes a display surface displaying the image IM thereon and a rear surface facing the display surface. In FIG. 2, the display surface corresponds to an upper surface of the sealing layer 220, and the rear surface corresponds to a lower surface of the substrate 210.

The display device DD further includes a flexible printed circuit board FPCB and a printed circuit board PCB.

The flexible printed circuit board FPCB electrically connects the electric panel 200 and the printed circuit board PCB. One end of the flexible printed circuit board FPCB is connected to an upper surface of the substrate 210 exposed to the outside by the sealing layer 220, and the other end of the flexible printed circuit board FPCB is connected to one surface of the printed circuit board PCB. The flexible printed circuit board FPCB may be a film having a flexibility.

The printed circuit board PCB applies a signal to the electric panel 200 or receives a signal from the electric panel 200 through the flexible printed circuit board FPCB. In addition, the printed circuit board PCB may be connected to a connector CB to receive a signal from the outside.

The rear case 300 is located under the electric panel 200 to accommodate the electric panel 200 therein. The rear case 300 includes a first portion 300-1 facing a rear surface of the electric panel 200 and a second portion 300-2 bent from the first portion 300-1 and extending in the third direction DR3. The first portion 300-1 and the second portion 300-2 define an inner space in which the electric panel 200 is accommodated. The rear case 300 is assembled with the window 100 such that the electric panel 200 is located between the rear case 300 and the window 100.

In order to manufacture the display device DD, a process to assemble the window 100 and the electric panel 200, i.e., a lamination process, is performed. When the window 100 and the electric panel 200 have a bent shape, a separate manufacturing apparatus may be required to accurately attach the window 100 to the electric panel 200.

Hereinafter, the manufacturing apparatus of the display device DD will be described in detail with reference to accompanying drawings. For the convenience of explanation, the same reference numerals denote the same elements in the previously described embodiments, and thus detailed descriptions of the same elements will be omitted. In addition, in the case where any component partially bent corresponding to the shape of the display device DD among the components of the display device DD corresponds to the flat area FA and the bent areas BA1 and BA2, a flat area and a bent area of the any component will be assigned with the same reference numerals as the flat area FA and the bent areas BA1 and BA2.

Figure 3:
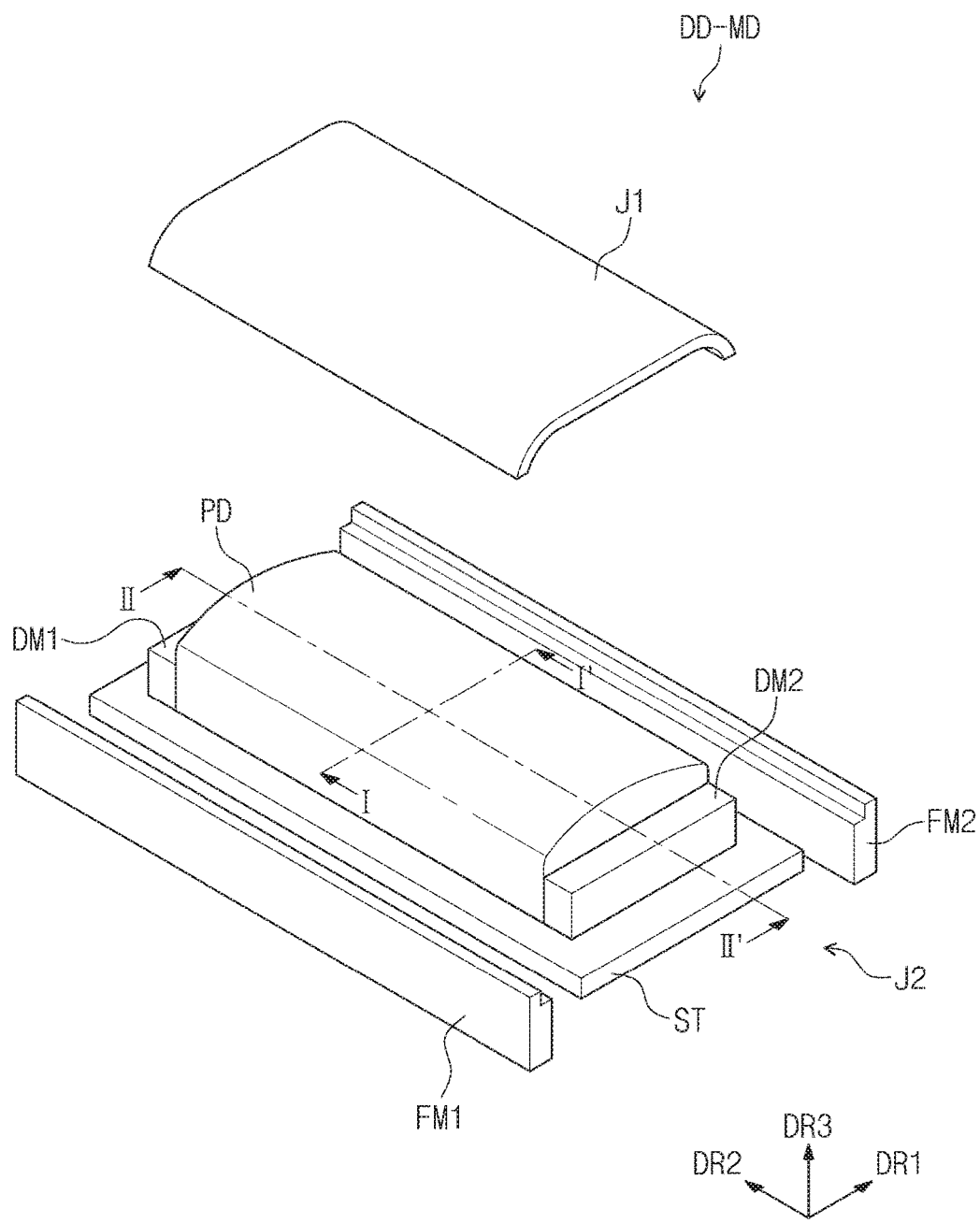
FIG. 3 is a perspective view showing a manufacturing apparatus of a display device according to an exemplary embodiment of the present disclosure.
Figure 4:
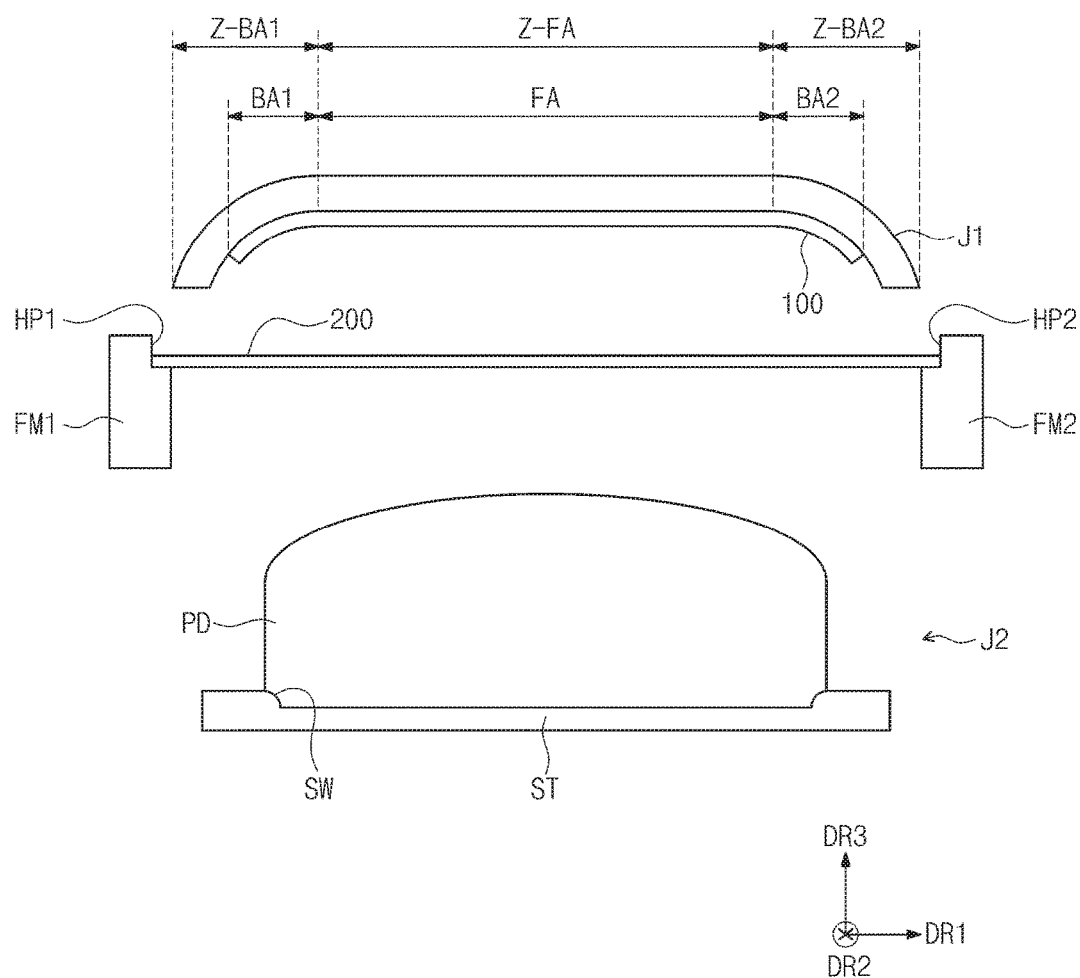
FIG. 4 is a cross-sectional view showing a manufacturing apparatus of a display device according to an exemplary embodiment of the present disclosure.

FIG. 3 is a perspective view showing a manufacturing apparatus DD-MD of the display device according to an exemplary embodiment of the present disclosure and FIG. 4 is a schematic cross-sectional view showing the manufacturing apparatus DD-MD of the display device according to an exemplary embodiment of the present disclosure.

Referring to FIGS. 3 and 4, the manufacturing apparatus DD-MD includes a first jig J1, a second jig J2, and fixing parts FM1 and FM2.

The first jig J1 and the second jig J2 are located to face each other and the electric panel 200 and the window 100 are located between the first jig J1 and the second jig J2.

The first jig J1 is located on the second jig J2. The first jig J1 is located on the window 100 and holds the window 100. An upper surface of the window 100 makes contact with a lower surface of the first jig J1.

The first jig J1 has a bent shape at at least a portion thereof to correspond to the shape of the window 100. The first jig J1 includes a jig flat area Z-FA and jig bent areas Z-BA1 and Z-BA2 connected to and bent from the jig flat area Z-FA. The jig bent areas Z-BA1 and Z-BA2 include a first jig bent area Z-BA1 and a second jig bent area Z-BA2 spaced from the first jig bent area Z-BA1 such that the jig flat area Z-FA is located between the first and second jig bent areas Z-BA1 and Z-BA2.

The jig flat area Z-FA is overlapped with the flat area FA of the window 100 and the jig bent areas Z-BA1 and Z-BA2 are overlapped with the bent areas BA1 and BA2 of the window 100.

The second jig J2 is located under the first jig J1. The second jig J2 moves in the third direction DR3 and is coupled to the first jig J1 such that the electric panel 200 and the window 100 are located between the first jig J1 and the second jig J2, or the second jig J2 moves in the direction opposite to the third direction DR3 to be separated from the first jig J1. Details on the second jig J2 will be described later.

The fixing parts FM1 and FM2 are located at at least one side of the second jig J2. In the present exemplary embodiment of the present disclosure, the fixing parts FM1 and FM2 include a first fixing part FM1 and a second fixing part FM2 located at both sides of the second jig J2, respectively. The first fixing part FM1 and the second fixing part FM2 are spaced from each other in the first direction DR1 and face each other. The first fixing part FM1 and the second fixing part FM2 hold the electric panel 200 to allow the electric panel 200 to be placed between the first jig J1 and the second jig J2.

The first fixing part FM1 and the second fixing part FM2 are spaced from each other in the first direction DR1 to hold one end of the electric panel 200 and the other end of the electric panel 200 extending in the second direction DR2, respectively.

The first fixing part FM1 includes a first holding part HP1 to hold the one end of the electric panel 200. The first holding part HP1 faces the rear surface and one side surface of the electric panel 200.

The second fixing part FM2 includes a second holding part HP2 to hold the other end of the electric panel 200. The second holding part HP2 faces the rear surface and the other side surface of the electric panel 200.

The shape of the first and second holding parts HP1 and HP2 are not limited to a specific shape, and the first holding part HP1 and the second holding part HP2 may have a slit shape to hold the one end and the other end of the electric panel 200. In addition, the first and second holding parts HP1 and HP2 may be provided as separate members respectively coupled to the first fixing part FM1 and the second fixing part FM2.

In FIG. 4, a distance in the first direction DR1 between the first fixing part FM1 and the second fixing part FM2 is substantially the same as a width in the first direction DR1 of the electric panel 200. However, since the first fixing part FM1 and the second fixing part FM2 may move in the first direction DR1 and the direction opposite to the first direction DR1, respectively, the distance in the first direction DR1 between the first fixing part FM1 and the second fixing part FM2 may be smaller than or greater than the width in the first direction DR1 of the electric panel 200.

When the distance in the first direction DR1 between the first fixing part FM1 and the second fixing part FM2 is smaller than the width of the electric panel 200, the electric panel 200 may be bent. When the distance in the first direction DR1 between the first fixing part FM1 and the second fixing part FM2 is greater than the width of the electric panel 200, the electric panel 200 may be separated from the first fixing part FM1 and the second fixing part FM2.

Figure 5:
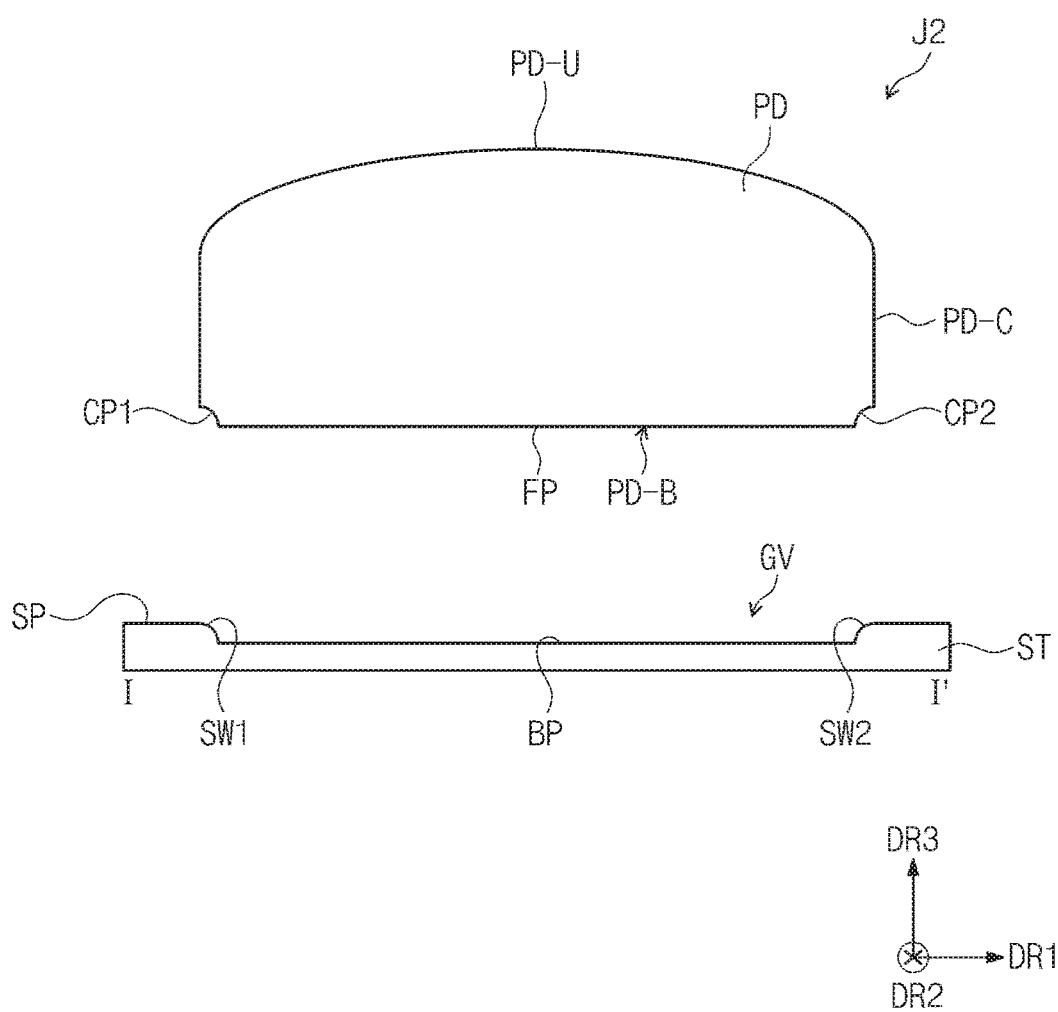
FIG. 5 is a cross-sectional view taken along a line I-I' of FIG. 3.
Figure 6:
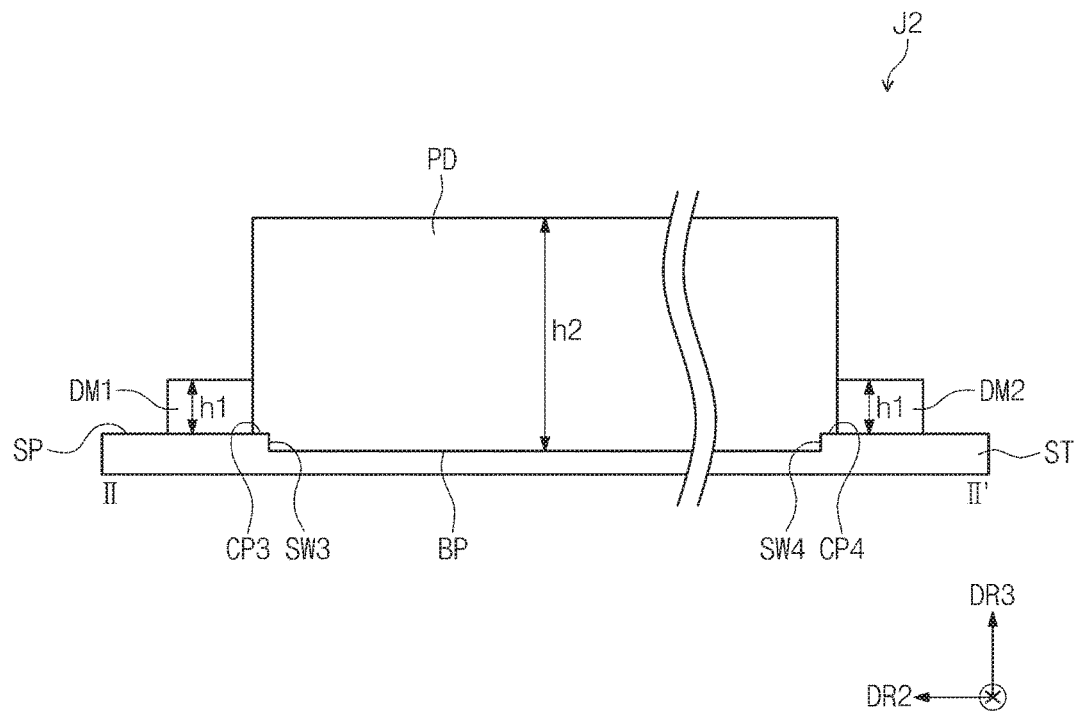
FIG. 6 is a cross-sectional view taken along a line II-II' of FIG. 3.

FIG. 5 is a cross-sectional view taken along a line I-I' of FIG. 3 and FIG. 6 is a cross-sectional view taken along a line II-II' of FIG. 3.

Referring to FIGS. 3 to 6, the second jig J2 includes a stage ST, a pad PD, and dams DM1 and DM2.

The stage ST is located under the pad PD to support the pad PD. When viewed in a plan view, the stage ST has a size greater than a size of the pad PD.

An upper surface of the stage ST includes a groove GV having a size smaller than the size of the pad PD when viewed in a plan view and a supporting surface SP surrounding the groove GV and substantially parallel to a plane surface defined by the first direction DR1 and the second direction DR2.

The groove GV is defined by a bottom portion BP that is flat and sidewalls SW bent and extending from the bottom portion BP.

The sidewalls SW connect the bottom portion BP and the supporting surface SP. The sidewalls SW include a first sidewall SW1 and a second sidewall SW2 spaced from the first sidewall SW1 in the first direction DR1 and facing the first sidewall SW1 such that the bottom portion BP is located between the first and second sidewalls SW1 and SW2 and a third sidewall SW3 and a fourth sidewall SW4 spaced from the third sidewall SW3 in the second direction DR2 and facing the third sidewall SW3 such that the bottom portion BP is located between the third and fourth sidewalls SW3 and SW4.

In the present exemplary embodiment, each of the first sidewall SW1 and the second sidewall SW2 has a curved shape. Specifically, each of the first sidewall SW1 and the second sidewall SW2 has an inclination angle that gradually becomes smaller as a distance from the bottom portion BP increases. Thus, the distance between the first sidewall SW1 and the second sidewall SW2 in the first direction DR1 becomes greater as the distance from the bottom portion BP increases in the third direction DR3.

As shown in FIG. 6, the third sidewall SW3 and the fourth sidewall SW4 extend in the third direction DR3, but they are not limited thereto.

Figure 7:
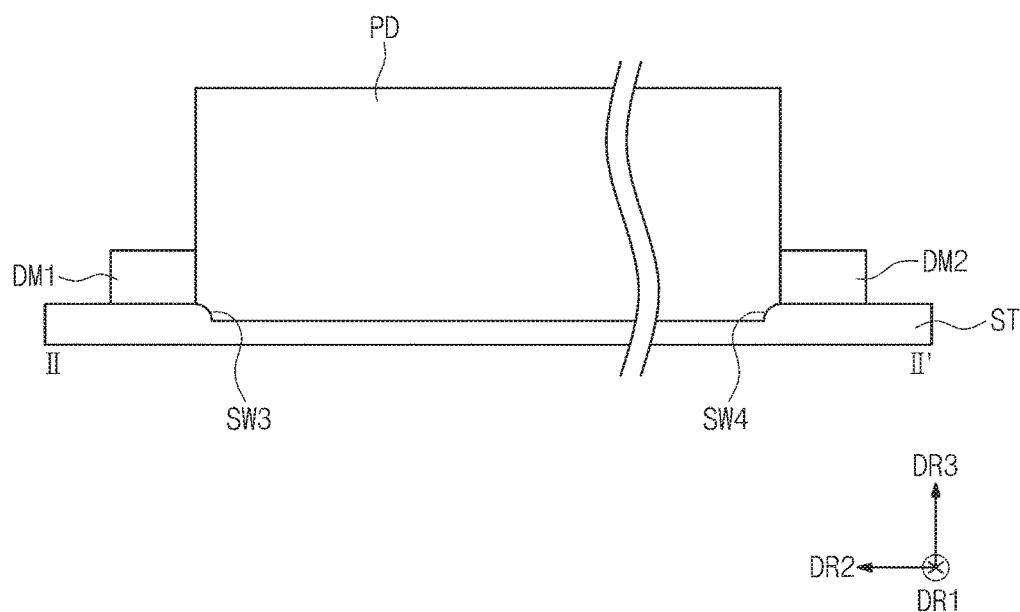
FIG. 7 is a cross-sectional view showing a manufacturing apparatus of a display device according to another exemplary embodiment of the present disclosure.

FIG. 7 is a cross-sectional view showing a manufacturing apparatus of a display device according to another exemplary embodiment of the present disclosure.

Each of the third and fourth sidewalls SW3 and SW4 may have a curved shape as shown in FIG. 7. In detail, each of the third and fourth sidewalls SW3 and SW4 may have an inclination angle that gradually becomes smaller as the distance from the bottom portion BP increases.

In the present exemplary embodiment, the pad PD is located to face the first jig J1 such that the window 100 and the electric panel 200 are located between the pad PD and the first jig J1. The pad PD includes an upper surface PD-U, a lower surface PD-B, and connection surfaces PD-C (FIG. 5).

In the present exemplary embodiment, the upper surface PD-U is located to face the first jig J1 and has a shape curved in the first direction DR1. The upper surface PD-U may have a convex curved surface protruding in the third direction DR3, but it is not limited thereto. In another exemplary embodiment, the upper surface PD-U may be curved in the first direction DR1 or the second direction DR2.

The lower surface PD-B is located to face the upper surface PD-U. At least a portion of the lower surface PD-B is substantially parallel to the plane surface defined by the first direction DR1 and the second direction DR2.

The lower surface PD-B includes a flat portion FP and concave portions CP. The flat portion FP has a size substantially the same as a size of the bottom portion BP of the groove GV. The flat portion FP directly makes contact with the bottom portion BP.

The concave portions CP connect the flat portion FP and the connection surfaces PD-C. Each of the concave portions CP is located to face a corresponding sidewall SW of the sidewalls SW.

The concave portions CP include a first concave portion CP1 and a second concave portion CP2, which respectively correspond to the first sidewall SW1 and the second sidewall SW2, and a third concave portion CP3 and a fourth concave portion CP4, which respectively correspond to the third sidewall SW3 and the fourth sidewall SW4.

Each of the first concave portion CP1 and the second concave portion CP2 has a curved shape. Each of the first concave portion CP1 and the second concave portion CP2 has an inclination angle that gradually becomes smaller as a distance from the flat portion FP increases.

As shown in FIG. 6, the third concave portion CP3 includes plane surfaces facing the third sidewall SW3 and the supporting surface SP. The fourth concave portion CP4 includes plane surfaces facing the fourth sidewall SW4 and the supporting surface SP. However, they are not limited thereto. In other words, each of the third and fourth concave portions CP3 and CP4 may have a curved shape as shown in FIG. 7. In detail, each of the third and fourth concave portions CP3 and CP4 may have an inclination angle that gradually becomes smaller as the distance from the bottom portion BP increases.

Referring to FIGS. 3 and 6, the connection surfaces PD-C connect the upper surface PD-U and the lower surface PD-B. The connection surfaces, which face each other and are spaced from each other in the second direction DR2, of the connection surfaces PD-C have a curved shape corresponding to the curved shape of the upper surface PD-U in an area where the connection surfaces are connected to the upper surface PD-U. And the connection surfaces, which face each other and are spaced from each other in the first direction DR1, of the connection surface PD-C may have a rectangular shape.

The pad PD includes a material having a flexibility, such as silicone, urethane, rubber, etc. When an external force is applied to at least a portion of the pad PD, a shape of the at least the portion of the pad PD may be deformed to be different from its original shape. However, when the external force is removed from the pad PD, the pad PD returns to its original shape. In addition, the pad PD absorbs impacts applied to the electric panel 200 while the window 100 and the electric panel 200 are pressed by the first jig J1 and the second jig J2. Thus, the pad PD prevents the electric panel 200 from being damaged.

The dams DM1 and DM2 are located on the supporting surface SP of the stage ST. The dams DM1 and DM2 are fixed to the stage ST as separate members, but they are not limited thereto. In other words, the dams DM1 and DM2 may be integrally formed with the stage ST. The dams DM1 and DM2 include a metal or plastic material.

The dams DM1 and DM2 are located to face at least one connection surface of the connection surfaces PD-C of the pad PD. In the present exemplary embodiment, the dams DM1 and DM2 include a first dam DM1 and a second dam DM2, which are located to face each other and spaced from each other in the second direction DR2. The first dam DM1 and the second dam DM2 are located to face two connection surfaces spaced from each other and facing each other in the second direction DR2 of the connection surfaces PD-C of the pad PD, respectively.

A height h1 of each of the first dam DM1 and the second dam DM2 in the third direction DR3, i.e., a length of each of the first dam DM1 and the second dam DM2 extending from the supporting surface SP of the stage ST in the third direction DR3, is in a range from about 10% to about 30% with respect to a length h2 of the pad PD extending from the bottom portion BP of the groove GV in the third direction DR3.

The second jig J2 may further include an adhesive member to fix the pad PD to the stage ST. The adhesive member is located on the bottom portion BP of the groove to hold the flat portion FP of the pad PD.

Figure 8:
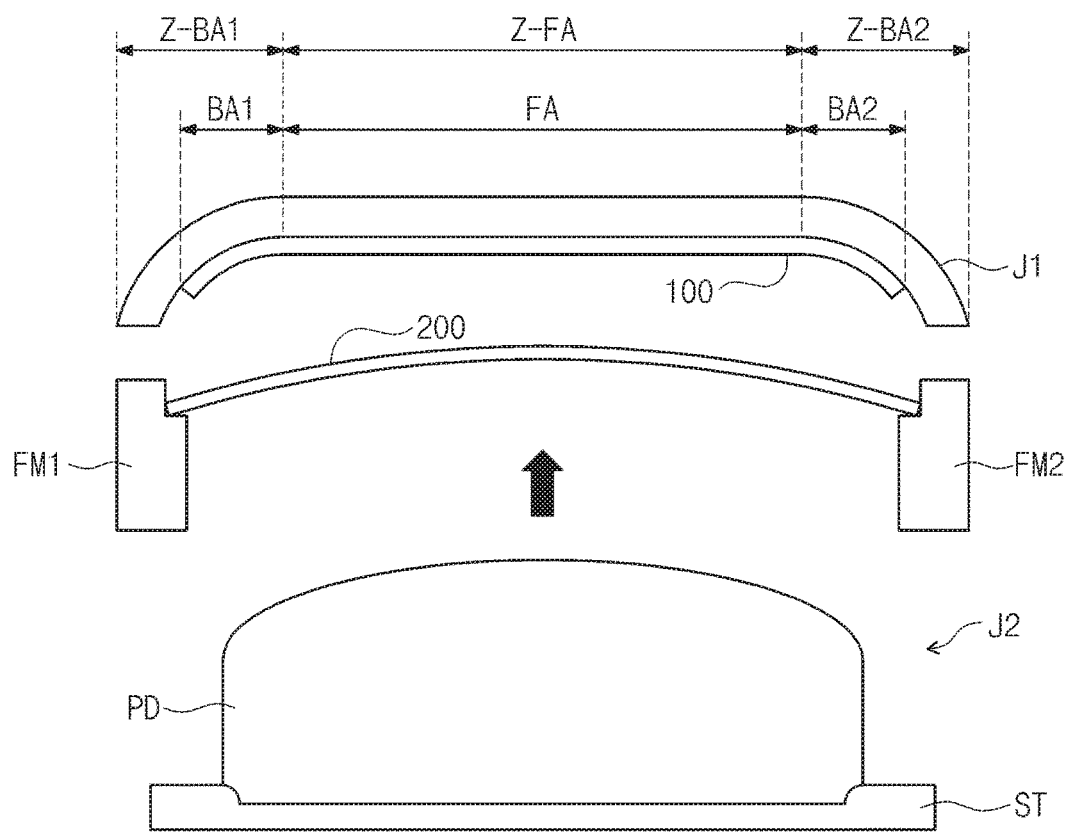
FIGS. 8 and 9 are views sequentially showing an operation state of the manufacturing apparatus of the display device according to an exemplary embodiment of the present disclosure.
Figure 8:
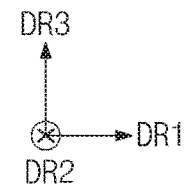
Figure 9:
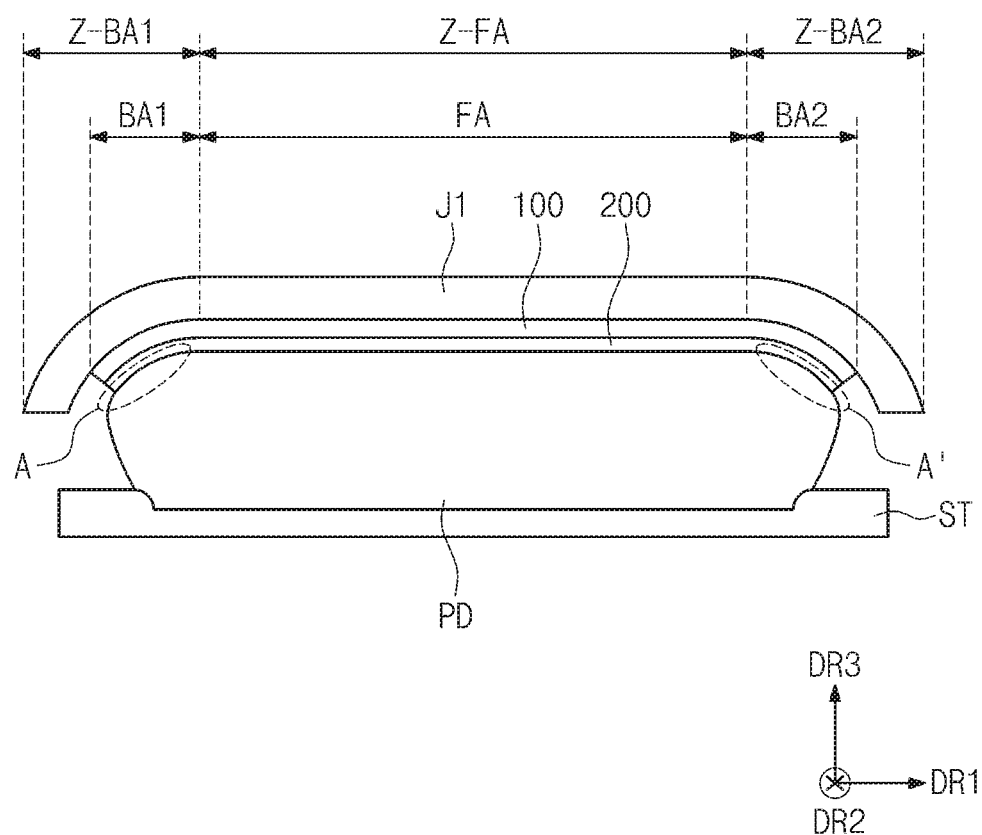

FIGS. 8 and 9 are views sequentially showing an operation state of the manufacturing apparatus of the display device according to an exemplary embodiment of the present disclosure.

Referring to FIGS. 8 and 9, the second jig J2 may move in the third direction DR3. In this case, as the first fixing part FM1 moves in the first direction DR1 and the second fixing part FM2 moves in the direction opposite to the first direction DR1, the distance in the first direction DR1 between the first fixing part FM1 and the second fixing part FM2 becomes smaller. Therefore, the electric panel 200 may be curved convex to protrude in the third direction DR3 to be close to the window 100.

The pad PD may move in the third direction DR3 to make contact with the rear surface of the electric panel 200. The pad PD may pressurize the electric panel 200 such that the electric panel 200 tightly makes contact with the window 100. In this case, the first fixing part FM1 moves in the direction opposite to the first direction DR1 and the second fixing part FM2 moves in the first direction DR1. As a result, the electric panel 200 is separated from the first and second fixing parts FM1 and FM2 and located between the pad PD and the window 100.

The pad PD may further pressurize the electric panel 200 to enhance an adhesive force between the window 100 and the electric panel 200.

In one embodiment, the shape of the pad PD may be temporarily deformed to correspond to the bent shape of the first jig J1 during the process of pressing the electric panel 200. In particular, the deformation of the pad PD may be intensified in an area A and an area A' shown in FIG. 9. In this case, as the force applied to the lower surface PD-B of the pad PD overlapped with the area A and the area A' becomes great, a crack may occur in the lower surface PD-B of the pad PD and the pad PD is damaged.

According to the present exemplary embodiment of the present disclosure, since the sidewalls SW of the stage ST, which are overlapped with the area A and the area A', have a bent shape, a force applied to the lower surface PD-B of the pad PD overlapped with the area A and the area A' may be distributed.

Further, the dams DM1 and DM2 support the connection surfaces of the pad PD, which are spaced from each other in the second direction DR2, and thus, the amount of deformation of the pad PD deformed in the second direction DR2 is reduced and the amount of deformation of the pad PD deformed in the first direction DR1 is relatively increased. As a result, the pad PD may uniformly pressurize the electric panel 200 to the window 100 using less force.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A manufacturing apparatus of a display device, the manufacturing apparatus comprising:
   a first jig configured to hold a first member;
   a second jig located under the first jig and coupled to or separated from the first jig such that the first member is locatable between the first jig and the second jig; and
   fixing parts located at both ends of the second jig and configured to hold a second member between the first member and the second jig, the second jig comprising:
   a pad; and
   a stage located under the pad and provided with a groove formed therethrough, the groove having an area smaller than an area of the pad when viewed in a plan view, wherein a portion of the pad facing the stage is configured to be within the groove.

2. The manufacturing apparatus of claim 1, wherein the groove comprises:
   a bottom portion being flat; and
   sidewalls bent and extending from the bottom portion, the sidewalls comprising a first sidewall having a curved shape.

3. The manufacturing apparatus of claim 2, wherein the first sidewall has an inclination angle that gradually reduces as a distance from the bottom portion increases.

4. The manufacturing apparatus of claim 3, wherein the pad comprises:
   an upper surface facing the first jig and being curved in a first direction;
   a lower surface located opposite to the upper surface; and
   connection surfaces connecting the upper surface and the lower surface.

5. The manufacturing apparatus of claim 4, wherein the lower surface comprises:
   a plane portion facing the bottom portion; and
   concave portions extending from the plane portion to connect the plane portion and the connection surfaces and each facing a corresponding sidewall of the sidewalls.

6. The manufacturing apparatus of claim 5, wherein the concave portions comprise a first concave portion having a curved shape to correspond to a shape of the first sidewall.

7. The manufacturing apparatus of claim 4, wherein the pad comprises at least one of silicone, urethane, and rubber.

8. The manufacturing apparatus of claim 4, wherein the upper surface is curved to protrude towards the first jig with respect to a plane surface defined by the first direction and a second direction crossing the first direction.

9. The manufacturing apparatus of claim 8, wherein the second jig further comprises a dam facing at least one connection surface of the connection surfaces of the pad.

10. The manufacturing apparatus of claim 9, wherein the dam has a height in a third direction which is substantially perpendicular to the first direction and the second direction, wherein the height of the dam is between about 10% to about 30% of a maximum height of the pad in the third direction.

11. The manufacturing apparatus of the claim 9, wherein the dam comprises a metal or plastic material.

12. The manufacturing apparatus of claim 1, wherein the first jig comprises:
a flat area; and
bending areas extending from the flat area and spaced from each other such that the flat area is located between the bending areas.

13. The manufacturing apparatus of claim 1, wherein the first member is a window.

14. The manufacturing apparatus of claim 13, wherein the second member is an electric panel having a flexibility.

15. A manufacturing apparatus of a display device comprising:
a first jig configured to hold a first member;
a second jig located under the first jig and coupled to or separated from the first jig to allow the first member to be placed between the first jig and the second jig; and
fixing members located at both ends of the second jig and configured to hold a second member such that the second member is located between the first member and the second jig, the second jig comprising:
a pad comprising an upper surface that faces the first jig and is curved in a first direction, a lower surface that faces the upper surface, and connection surfaces connecting the upper surface and the lower surface;
a stage located under the pad and provided with a groove formed therethrough into which at least a portion of the lower surface is insertable; and
a dam located on the stage and facing one of the connection surfaces, wherein the groove comprises a bottom portion having a flat shape and a curved sidewall extending from the bottom portion.

16. The manufacturing apparatus of claim 15, wherein the lower surface comprises:
a planar portion facing the bottom portion; and
a concave portion extending from the planar portion to connect the plane portion and the connection surfaces and having a concave curved surface from the plane portion to correspond to the curved sidewall.

\* \* \* \* \*